US009053165B2

(12) United States Patent
van Rossum

(10) Patent No.: US 9,053,165 B2
(45) Date of Patent: Jun. 9, 2015

(54) STRUCTURED CONTENT ITEM SYNCHRONIZATION

(71) Applicant: Dropbox, Inc., San Francisco, CA (US)

(72) Inventor: Guido van Rossum, Belmont, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 14/040,584

(22) Filed: Sep. 27, 2013

(65) Prior Publication Data

US 2015/0012488 A1    Jan. 8, 2015

Related U.S. Application Data

(60) Provisional application No. 61/843,778, filed on Jul. 8, 2013.

(51) Int. Cl.
| | | |
|---|---|---|
| G06F 17/00 | (2006.01) | |
| G06F 17/30 | (2006.01) | |
| H04L 29/08 | (2006.01) | |
| G06Q 10/10 | (2012.01) | |
| G06F 11/00 | (2006.01) | |

(52) U.S. Cl.
CPC ...... *G06F 17/30581* (2013.01); *H04L 67/1095* (2013.01); *G06Q 10/101* (2013.01); *G06F 17/30578* (2013.01); *G06F 11/00* (2013.01)

(58) Field of Classification Search
None
See application file for complete search history.

(56) References Cited

U.S. PATENT DOCUMENTS

| | | | | |
|---|---|---|---|---|
| 7,089,307 | B2 * | 8/2006 | Zintel et al. | 709/224 |
| 7,401,104 | B2 * | 7/2008 | Shah et al. | 707/620 |
| 7,533,134 | B2 * | 5/2009 | Terry et al. | 1/1 |
| 7,620,659 | B2 * | 11/2009 | Novik et al. | 1/1 |
| 7,822,711 | B1 | 10/2010 | Ranade | |
| 7,912,916 | B2 * | 3/2011 | Rakowski et al. | 709/217 |
| 8,019,877 | B2 * | 9/2011 | Li et al. | 709/227 |
| 8,086,698 | B2 * | 12/2011 | Rakowski et al. | 709/218 |
| 8,156,078 | B2 * | 4/2012 | Tsinman et al. | 707/622 |
| 8,386,558 | B2 | 2/2013 | Schleifer et al. | |
| 8,468,132 | B1 * | 6/2013 | O'Neill et al. | 707/622 |

(Continued)

FOREIGN PATENT DOCUMENTS

WO    WO 2011/109416 A2    9/2011

OTHER PUBLICATIONS

"Operational Transformation," Wikipedia, Last Modified Oct. 28, 2013, 8 pages, [Online] [Retrieved on Jan. 6, 2014] Retrieved from the Internet<URL:http://en.wikipedia.org/wiki/Operational_transformation>.

(Continued)

*Primary Examiner* — Hung Le
(74) *Attorney, Agent, or Firm* — Fenwick & West LLP

(57) ABSTRACT

A content management system defines a synchronization application programming interface (API) used by applications executing on client devices to synchronize content items after the content items are changed. Functions of the API specify changes to the content items in terms of semantically-meaningful locations within the content items, rather than physical file locations. The content management system can represent the state of a content item in terms of change descriptors that reference the semantic locations of the API. The content management system can then distribute the change descriptors to the client devices, which refer to the semantic locations of the change descriptors when determining how to reconcile changes made by other client devices.

19 Claims, 9 Drawing Sheets

(56) References Cited

U.S. PATENT DOCUMENTS

| | | | |
|---|---|---|---|
| 8,495,015 B2* | 7/2013 | Freedman | 707/622 |
| 8,635,209 B2* | 1/2014 | Freedman | 707/722 |
| 8,719,225 B1* | 5/2014 | Rath | 707/634 |
| 8,843,441 B1* | 9/2014 | Rath et al. | 707/614 |
| 8,930,312 B1* | 1/2015 | Rath et al. | 707/634 |
| 2004/0024795 A1* | 2/2004 | Hind et al. | 707/204 |
| 2004/0058710 A1* | 3/2004 | Timmins et al. | 455/560 |
| 2005/0022210 A1* | 1/2005 | Zintel et al. | 719/318 |
| 2005/0044187 A1 | 2/2005 | Jhaveri et al. | |
| 2005/0223047 A1* | 10/2005 | Shah et al. | 707/201 |
| 2006/0101064 A1* | 5/2006 | Strong et al. | 707/102 |
| 2006/0288053 A1* | 12/2006 | Holt et al. | 707/203 |
| 2007/0027853 A1* | 2/2007 | Hajela et al. | 707/3 |
| 2008/0222296 A1* | 9/2008 | Lippincott et al. | 709/227 |
| 2009/0006498 A1* | 1/2009 | Freedman | 707/203 |
| 2009/0113412 A1* | 4/2009 | Shribman et al. | 717/170 |
| 2009/0271696 A1* | 10/2009 | Bailor et al. | 715/229 |
| 2009/0292709 A1* | 11/2009 | Tsinman et al. | 707/10 |
| 2009/0313311 A1* | 12/2009 | Hoffmann et al. | 707/204 |
| 2009/0327358 A1* | 12/2009 | Lukiyanov et al. | 707/203 |
| 2010/0138387 A1 | 6/2010 | Simelius | |
| 2010/0191884 A1* | 7/2010 | Holenstein et al. | 710/200 |
| 2011/0106880 A1* | 5/2011 | Strong et al. | 709/203 |
| 2011/0113092 A1* | 5/2011 | Rakowski et al. | 709/203 |
| 2011/0208805 A1* | 8/2011 | Kasetty et al. | 709/203 |
| 2011/0296042 A1* | 12/2011 | Li et al. | 709/228 |
| 2012/0005159 A1* | 1/2012 | Wang et al. | 707/617 |
| 2012/0089710 A1* | 4/2012 | Rakowski et al. | 709/220 |
| 2012/0130953 A1* | 5/2012 | Hind et al. | 707/638 |
| 2012/0151495 A1* | 6/2012 | Burckhardt et al. | 718/106 |
| 2012/0185434 A1* | 7/2012 | Giampaolo et al. | 707/634 |
| 2013/0006947 A1* | 1/2013 | Akinyemi et al. | 707/687 |
| 2013/0151596 A1* | 6/2013 | Strong et al. | 709/203 |
| 2013/0204841 A1* | 8/2013 | Obusek | 707/624 |
| 2013/0212480 A1* | 8/2013 | Ben-Shaul et al. | 715/737 |
| 2013/0282656 A1* | 10/2013 | O'Neill et al. | 707/622 |
| 2014/0040202 A1* | 2/2014 | Hagan et al. | 707/634 |
| 2014/0250064 A1* | 9/2014 | Hopmann et al. | 707/623 |

OTHER PUBLICATIONS

"Concurrent Versions System," Wikipedia, Jun. 20, 2013, 9 pages, [Online] [Retrieved on Sep. 23, 2014] Retrieved from the Internet<URL:http://en.wikipedia.org/w/index.php?title=Concurrent_Versions_System& oldid=560712674>.

PCT International Search Report and Written Opinion, PCT Application No. PCT/US2014/045631, Oct. 6, 2014, 14 pages.

"Rsync," Wikipedia, Jun. 26, 2013, 8 pages, [Online] [Retrieved in Sep. 23, 2014] Retrieved from the Internet<URL:http://en.wikipedia.org/w/index.php?title=Rsync&oldid=561668126>.

* cited by examiner

STRUCTURED CONTENT ITEM SYNCHRONIZATION

CROSS REFERENCE TO RELATED APPLICATIONS

The application claims the benefit of Provisional Application No. 61/843,778, filed on Jul. 8, 2013, which is hereby incorporated herein by reference.

TECHNICAL FIELD

The disclosed embodiments relate generally to sharing of data over a network. In particular, the disclosed embodiments are directed to synchronizing different inconsistent copies of data.

BACKGROUND

It is now common for an individual to regularly use multiple computers from multiple different locations. A typical user may have a first computer at the office and a second computer at home, for example, as well as a portable computer, and a web-enabled mobile device such as a smartphone or tablet computer. To have ready access to the user's content, it is desirable for the user to share that content between these multiple computers.

One attempt to solve this problem has involved the use of network storage devices, whereby services offer users the opportunity to store their documents or other items of content "in the cloud"—that is, on servers accessible to users via the Internet or other network. For example, a user who is interested in working on a document from multiple locations can store the document on a network file server and then edit it from home, work, or any other location that provides network access to the file server. For convenience, the users of such systems may store local copies of the documents from the server on their different computers, viewing and editing the local copies using applications installed on the computers. If the users make changes, they may then upload the changed copies back to the server. In a similar manner, a user may indirectly make changes to files or other data by using applications running on the user's different computers, with the applications making changes to the files or other data in response to the user's actions in the applications. In order to maintain a consistent state of the applications, these files also need to be uploaded to the server and distributed to the user's other computers.

In some situations, however, the different copies of the user's content (documents, files, or other data) on the different user computers can become inconsistent. This may occur, for example, when one or more of the computers temporarily lacks network connectivity, preventing the changed content from being uploaded back to the server. The user might then switch to a different computer, access the (unchanged) content on the server, and make a separate, different change to the content. Thus, when the two different changed sets of content are eventually uploaded back to the server, it will be necessary to reconcile the separate changes to avoid losing user information.

In many instances, however, the server itself is ill-equipped to reconcile the changes. For example, the documents may have data formats unknown to the server, and thus the server will not be able to make a semantically meaningful determination of what the changes are. (This is particularly the case where a single logical change to a document leads to physical changes at multiple distinct locations in the document, such as in the case of documents whose data are described by elements with both opening and closing tags in various subparts, for example.) Lacking a representation of the changes at a semantic, rather than physical, level, the server cannot provide the user with a useful summary of the changes, much less automatically reconcile the changes.

SUMMARY

A content management system has content storage storing content items. The content items aggregate the changes to counterpart copies of content items located on different client devices that use the content management system for synchronization of the content item copies. The content management system further defines a synchronization application programming interface (API) used by applications executing on the client devices to synchronize the content items after the content items are changed.

Functions of the API specify changes to the content items in terms of semantically meaningful locations, rather than physical byte-based locations (i.e., a location specified purely in terms of a byte or block number within a file). For example, in one embodiment the content item locations are described in terms of records within a file or files embodying the content item, and further in terms of fields within the specified record. When an instance of an application executing on a client device changes the state of its local content item copy, it calls a notification function of the synchronization API, describing the change in terms of the semantic location defined by the API. When the content management system receives the notification of the change sent to it by the application instance as a result of the notification function, it determines whether the change was made with respect to the latest version of the corresponding content item already stored on the content management system, or whether there have been intervening changes made by other instances of the application running on other client devices.

In one embodiment, presuming that there have been no intervening changes, the content management system updates the content item by storing the change in association with the content item, the result being the latest version of the content item. If, however, there were intervening changes, the content management system rejects the change sent by the notification function, sending the application instance a list of the most recent changes not already reflected in the local content item copy managed by the application instance. The application instance then applies its own knowledge of the data semantics of the content item that it manages, determining whether its own latest change, and the changes provided by the application access server, can be reconciled without loss of information.

In one embodiment, presuming that the changes can be reconciled, the application instance reconciles the changes by incorporating the changes provided by the content management system into its own local copy of the content item. If the changes cannot be completely reconciled, the application instance may (for example) remove its own most recent changes to its local content item copy, instead making a change to the local copy that represents its best approximation of the combination of the changes. In either case, to ensure that the application instances on all related client devices have access to the same data, the application instance uses the notification function of the API to describe its own latest change—either the complete change that was rejected by the content management system, or its best approximation thereof that is consistent with the changes to the content item copy already stored on the content management system.

Since the updated changes provided by the content management system now reflect changes to the version of the content item already stored on the content management system, the content management system accepts and stores the updated changes. The updated changes, together with the prior changes already accepted, constitute the current state of the content item. Other application instances can then obtain these changes in response to their queries for any more recent versions of the content item and can incorporate them into their own local content items. This has the effect of synchronizing the content item across the different client devices.

Alternatively and/or additionally, the content management system may have knowledge of the semantics of the changes to the content item, and may accordingly update the data of the content item by implementing the changes to the content item, rather than simply storing a list of the changes to the content item.

In embodiments in which the content management system need only store and provide descriptions of the changes to the content items in terms of locations having semantic meaning to the applications, and need not itself reconcile different changes, the content management system is freed from the necessity of having knowledge of different data formats. Accordingly, the content management system can efficiently facilitate synchronization of content items for any number of different applications having any number of different content item formats.

BRIEF DESCRIPTION OF THE DRAWINGS

FIGS. 2A-2C illustrate various changes to an example content item to be synchronized, according to one embodiment.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1A:
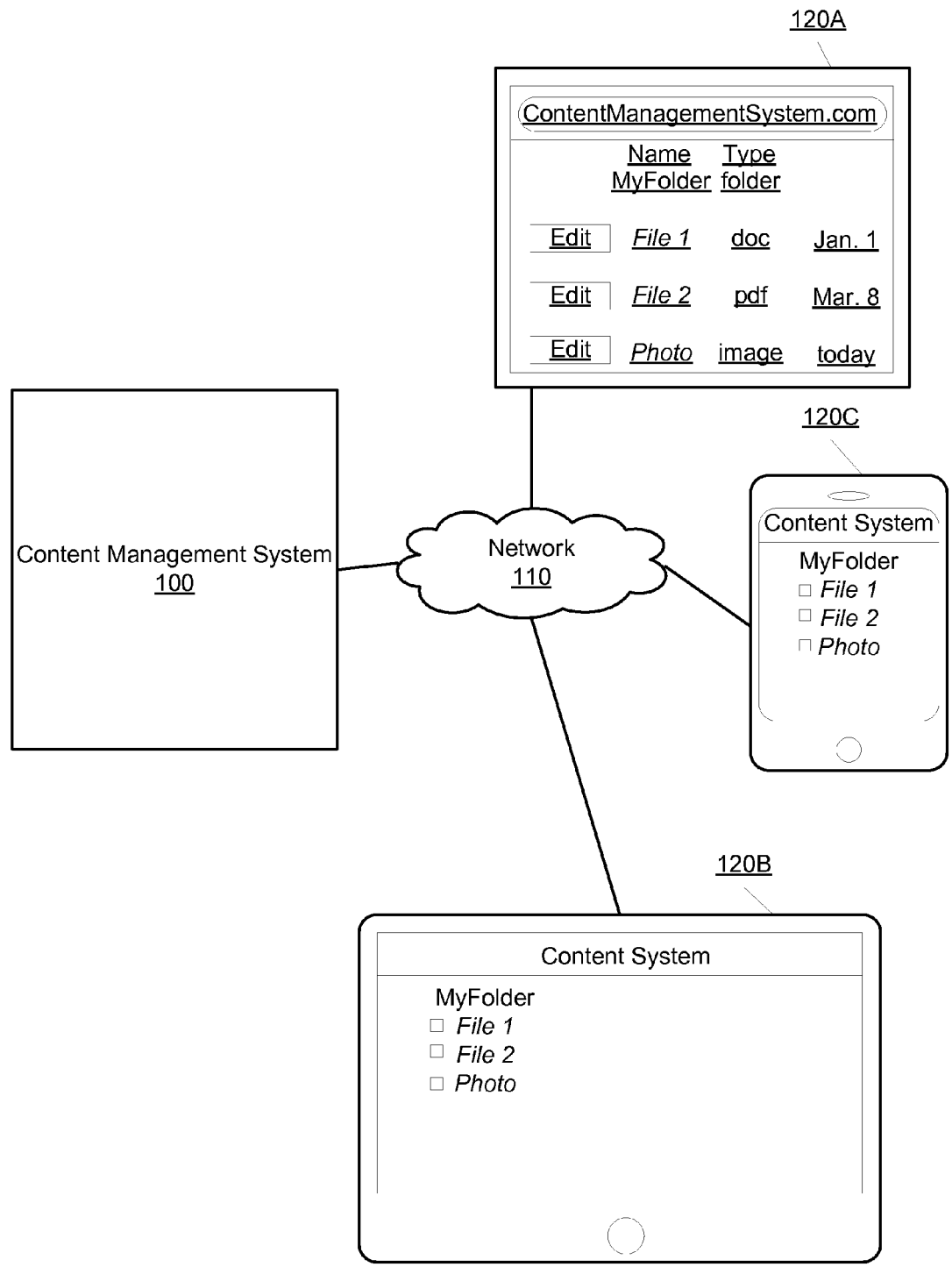
FIG. 1A shows a system environment including a content management system and client devices, according to one embodiment.

FIG. 1A shows a system environment including content management system 100, and client devices 120A, 120B, 120C (collectively or individually "120"). Content management system 100 provides content sharing and synchronization services for users of client devices 120. These services allow users to share content with other users of client devices 120. In addition to content sharing, content management system 100 updates shared content responsive to changes and enables users to synchronize changes across multiple client devices 120. A user may synchronize content across multiple client devices 120 owned by the user and associated with the user's account, and the user may share content that is synchronized with devices associated with other users' accounts. The content stored by content management system 100 can include any type of data, such as digital data, documents, media (e.g., images, photos, videos, audio, streaming content), data files and databases, source and object code, recordings, and any other type of data or file, hereinafter collectively referred to as a "content item." The content stored by content management system 100 may be organized in one configuration in folders, tables, collections, or in other database structures (e.g., object oriented, key/value etc.). The content stored by the content management system 100 may include content provided by one or more content providers.

In the environment illustrated in FIG. 1A, each of client devices 120 accesses content through content management system 100. Thus, each client device 120 may jointly access various types of content, such as a folder MyFolder containing files such as file 1, file 2, and photo. Various types of devices can function as a client device, such as desktop computer 120A, tablet computer 120B, and mobile device 120C. Any device capable of accessing content management system 100 and interacting with the content items stored on content management system 100 may be used as a client device 120.

Users may create accounts at content management system 100 and store content thereon by transmitting such content from client device 120 to content management system 100. The content provided by users is associated with user accounts that may have various privileges. The privileges may include viewing the content item, modifying the content item, modifying user privileges related to the content item, and deleting the content item.

Client devices 120 communicate with content management system 100 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 1B:
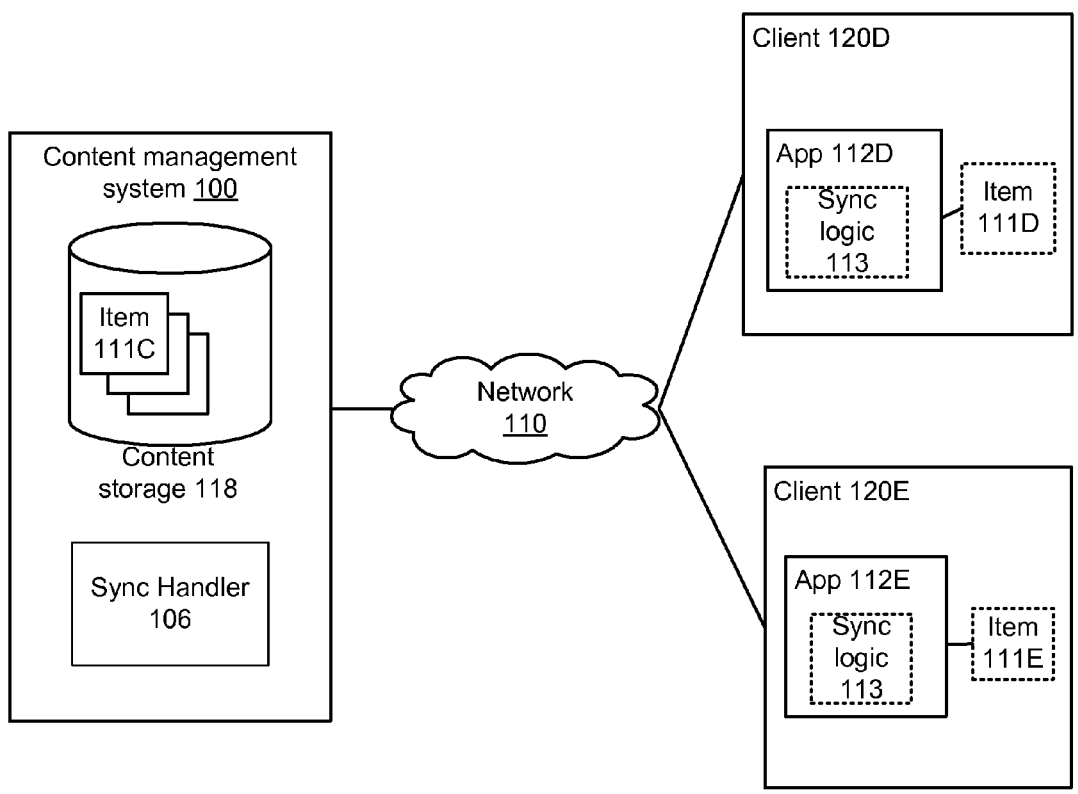
FIG. 1B shows a particular example of the configuration of FIG. 1A.

FIG. 1B shows a particular example of the configuration of FIG. 1A. FIG. 1B depicts content item 111 associated with application 112. FIG. 1B also depicts client device 120D and client device 120E, which could be of the types of client devices 120A-120C of FIG. 1A, such as a desktop computer, a tablet computer, or a mobile device. Both client device 120D and client device 120E have their own local copies of the application (i.e., application instances 112D and 112E) and the content item (i.e., content item copies 111D and 111E). (Note that as used herein, the term "content item 111" refers to a particular content item in a generic sense, without reference to a specific instance or copy, whereas the terms "content item copy 111D" or "content item copy 111E" refer to the specific copies of the content item stored on client device 120D or client device 120E, respectively. Similarly, the term "application 112" refers generically to any instance of a particular application, whereas the terms "application instance 112D" and "application instance 112E" refer to the specific instances of that application that execute on client device 120D and client device 120E, respectively.)

As an example of application 112 and its associated content item 111, the application could be an electronic game, and the content item could be a file storing the state of the game for the user, such as a list of the levels that the user has unlocked and that are thus available to the user. As another example, application 112 could be a day planner application, and content item 111 could be a file storing a list of different days and data about the tasks associated with those days.

Since content item 111 can be stored locally on client devices 120 (e.g., as the content item copies 111D and 111E illustrated in FIG. 1B) and modified by client devices 120, a particular content item copy can be changed to have a state different from that of other copies of the same content item on different client devices. For example, FIGS. 2A-2C illustrate various copies of an example comma-separated value file content item 111 that might be used by electronic game application 112 to represent the status of portions of the game available to the user. FIG. 2A could represent an initial copy of file content item 111 at the time that the user starts to play the game, where each line of the file represents a particular world within the game, and each element of a line represents the corresponding level within that world. Thus, in FIG. 2A only the first element of the first line has the value '1', and all the other elements have the value '0', signifying that the first level of the first world is available to the user but all the remaining levels have yet to be unlocked. This initial copy of content item 111 of FIG. 2A might be installed on each client device 120 along with application 112, or might be obtained through distribution to the different client devices 120 via the content management system 100.

FIG. 2B might represent content item copy 111D of FIG. 1B that results when the user plays game application 112D on client device 120D and unlocks the second level of the first world (signified by the value '1' in the second element of the first line), e.g., by taking a particular exit out of the first level. In contrast, FIG. 2C might represent content item copy 111E that results when the user plays the instance 112E of the same game application on client device 120E, starting from the state of FIG. 2A, and unlocks the third level of the first world, e.g., by taking a different exit out of the first level.

The ability of the different instances of application 112 to change the local copies of content item 111 on their associated client devices 120 introduces the potential for data inconsistency, which can in turn lead to an inconsistent user experience on the different client devices. Continuing the example, when the user in future plays game application instance 112D on client device 120D, she will be able to play the second level of the first world, but not the third level of the first world, even though she has previously unlocked both levels. Conversely, when she plays game application instance 112E on client device 120E, she will be able to play the third level but not the second level. Such inconsistencies could arise if, for example, client device 120E were a smartphone or tablet computer on which the user played game application instance 112D when out of range of cellular or wireless connectivity and then turned off before connectivity was regained, and the user then played game application instance 112E on the client device 120E before turning client device 120D on again.

Continuing the example, further assume that client device 120E has network connectivity and stores its copy of file content item 120E before client device 120D, and then client device 120D attempts to store its (different) copy of file content item 120D. In such a situation, a traditional file server could note the existence of an inconsistency between content item copies 111D and 111E, in that the content item data are not identical. However—assuming that the file format illustrated in FIGS. 2A-2C is specific to game application 112 and is unknown to the traditional file server—the traditional file server would merely be able to note that the contents of the files were not identical, but would not be able to reconcile the differences. If the traditional file server attempted to address the problem by storing only one of content item copies 111D, 111E, then access to one of the levels would (incorrectly) be unavailable. Further, reconciling inconsistencies between content items becomes still more difficult in the case of different file types, such as XML or other files with both opening and closing tags, where a single change might result in changes to multiple distinct physical locations within the file.

Given this potential for inconsistency inherent in content item changes taking place in parallel before the changes have been fully distributed, content management system 100 also includes synchronization handler 106 that facilitates synchronizing the different copies of content items, even when the different copies have been changed in different manners. To this end, content management system 100 provides a synchronization API that enables applications 112 that use content management system 100 for content item synchronization to specify changes to the content items according to a high-level semantic schema. The different instances of the same application 112 can then use the specification of the changes to more easily determine what sort of changes have been made to a given content item 111 by the other application instances 112, whether these changes introduce any inconsistencies, and how to reconcile the inconsistencies. Synchronization logic 113 within applications 112 uses the synchronization API of synchronization handler 106 to initiate the synchronization process.

It is appreciated that FIG. 1B represents a simplified example, in which only a few components of content management system 100 and client devices 120 are depicted for the sake of clarity. Content management system 100 and client devices 120 are now described more fully with respect to FIGS. 3 and 4, below.

Figure 3:
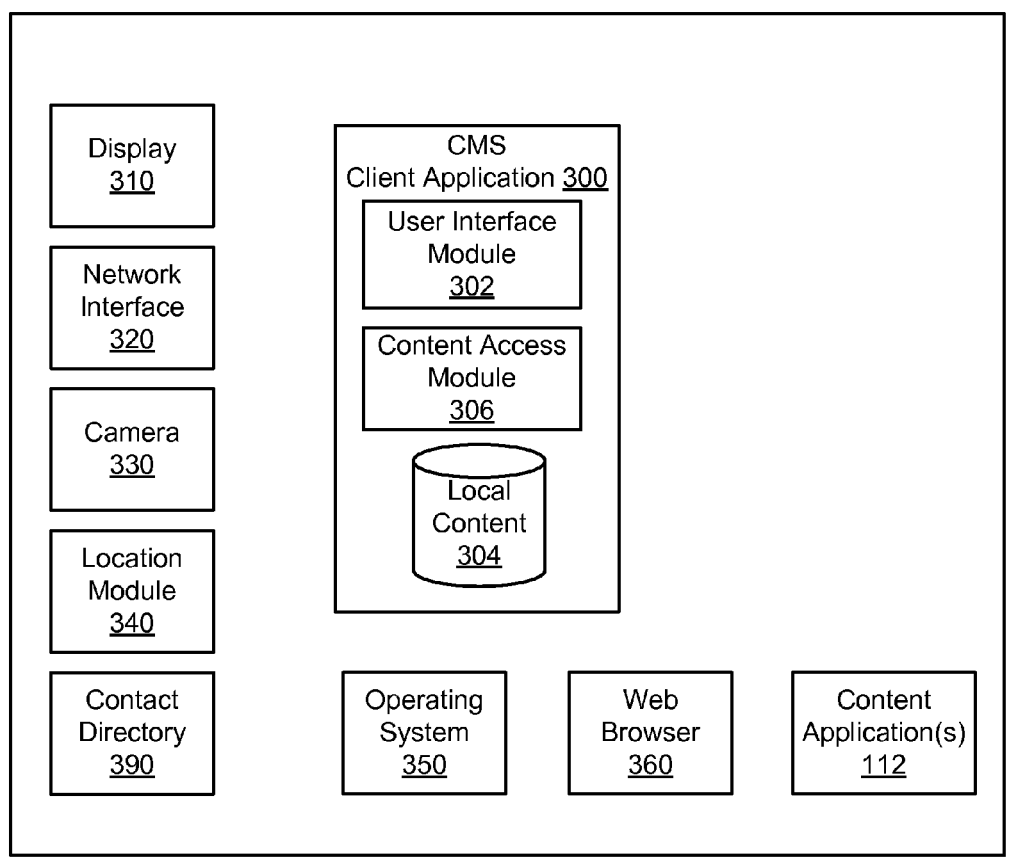
FIG. 3 shows one embodiment of components of the client device of FIGS. 1A and 1B.

FIG. 3 shows one embodiment of components of client device 120 of FIGS. 1A and 1B. Client device 120 generally includes devices and modules for communicating with content management system 100 and a user of client device 120. Client device 120 includes display 310 for providing information to the user, and in certain client devices 120 includes a touchscreen. Client device 120 also includes network interface 320 for communicating with content management system 100 via network 110. Other conventional components of a client device 120 that are not material are not shown, for example, one or more computer processors, local fixed memory (RAM and ROM), as well as optionally removable memory (e.g., SD-card), power sources, and audio-video outputs.

Client devices 120 maintain various types of components and modules for operating the client device and accessing content management system 100. The software modules include operating system 350 and one or more applications 112. Applications 112 vary based on the client device, and may include various applications for creating, viewing, and/or modifying content stored on content management system 100, such as word processors, spreadsheets, database management systems, code editors, image and video editors, and the like. Operating system 350 on each device provides a local file management system and executes the various software modules such as content management system client application 300 and application 112. A contact directory 390 stores information on the user's contacts, such as name, telephone numbers, company, email addresses, physical address, website URLs, and the like.

Client devices 120 access content management system 100 in a variety of ways. Client device 120 may access content management system 100 through a native application or software module, such as content management system client application 300. A schematic example display from a client application is shown in FIG. 1A on client devices 120B and 120C. Client device 120 may also access content management system 100 through web browser 360 as shown on client device 120A. As an alternative, the client application 300 may integrate access to content management system 100 with the local file management system provided by operating system 350. When access to content management system 100 is integrated in the local file management system, a file organization scheme maintained at content management system is represented as a local file structure by operating system 350 in conjunction with client application 300.

Client application 300 manages access to content management system 100. Client application 300 includes user interface module 302 that generates an interface to the content accessed by client application 300, as variously illustrated herein, and is one means for performing this function. The generated interface is provided to the user by display 310. Client application 300 may store content accessed from a content storage at content management system 100 in local content 304. While represented here as within client application 300, local content 304 may be stored with other data for client device 120 in non-volatile storage. When local content 304 is stored this way, the content is available to the user and other applications or modules, such as application 112, when client application 300 is not in communication with content management system 100. Content access module 306 manages updates to local content 304 and uses synchronization logic 113 to communicate with content management system 100 to synchronize content modified by client device 120 with content maintained on content management system 100, and is one means for performing this function. Client application 300 may take various forms, such as a stand-alone application, an application plug-in, or a browser extension.

In certain embodiments, client device 120 includes additional components such as camera 330 and location module 340. Location module 340 determines the location of client device 120, using for example a global positioning satellite signal, cellular tower triangulation, or other methods. Location module 340 may be used by client application 300 to obtain location data and add the location data to metadata about a content item.

Figure 4:
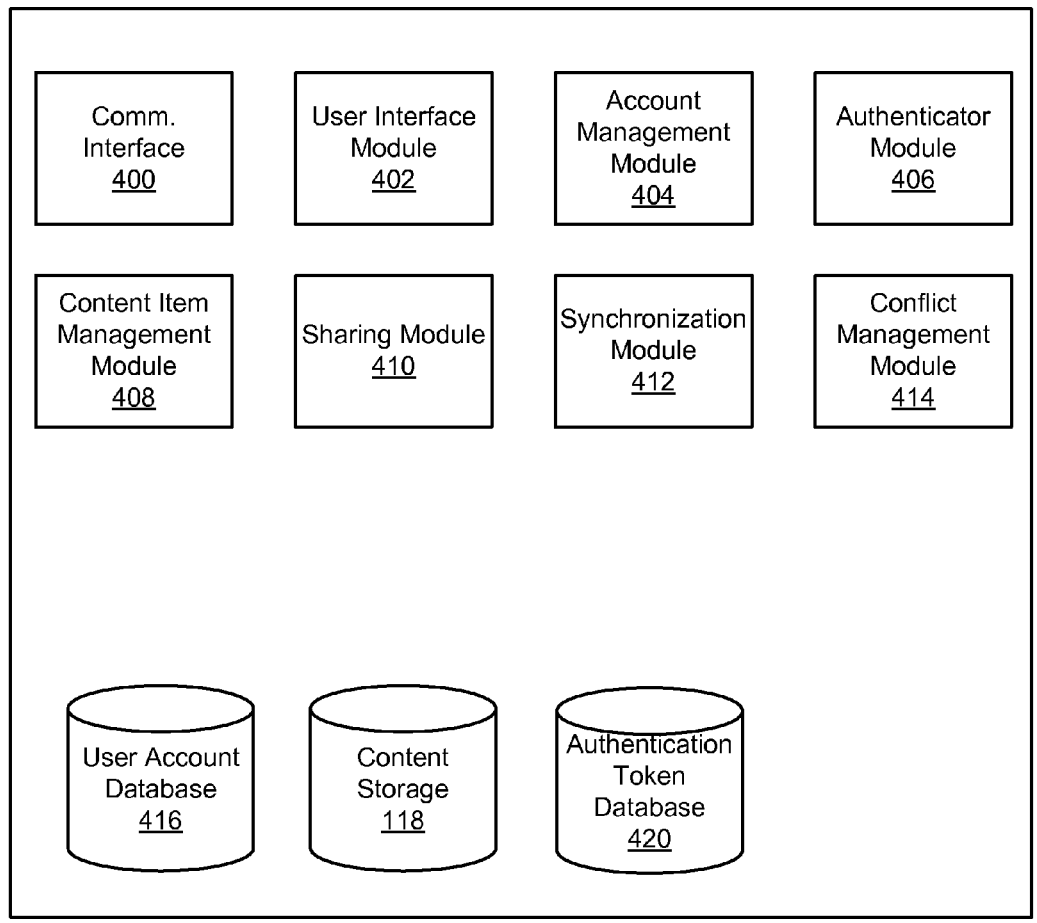
FIG. 4 shows components of the content management system of FIGS. 1A and 1B, according to one embodiment.

FIG. 4 shows components of content management system 100 of FIGS. 1A and 1B, according to one embodiment. To facilitate the various content management services, a user can create an account with content management system 100. The account information can be maintained in user account database 416, and is one means for performing this function. User account database 416 can store profile information for registered users. In some cases, the only personal information in the user profile can be a username and/or email address. However, content management system 100 can also be configured to accept additional user information, such as password recovery information, demographics information, payment information, and other details. Each user is associated with an identifier, such as a userID or a user name.

User account database 416 can also include account management information, such as account type, e.g. free or paid; usage information for each user, e.g., file edit history; maximum storage space authorized; storage space used; content storage locations; security settings; personal configuration settings; content sharing data; etc. Account management module 404 can be configured to update and/or obtain user account details in user account database 416. Account management module 404 can be configured to interact with any number of other modules in content management system 100.

An account can be used to store content, such as documents, text files, audio files, video files, etc., from one or more client devices associated with the account. The content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include a photos folder that is intended for photo content items and that provides specific attributes and actions tailored for photos; an audio folder that provides the ability to play back audio file content items and perform other audio related actions; or other special purpose folders. An account can also include shared folders or group folders that are linked with and available to multiple user accounts. The permissions for multiple users may be different for a shared folder.

The content can be stored in content storage 118, which is one means for performing this function. Content storage 118 can be a storage device, multiple storage devices, or a server. Alternatively, content storage 118 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 118 can also store metadata describing content items, content item types, and the relationship of content items to various accounts, folders, or groups. The metadata for a content item can be stored as part of the content item or can be stored separately. In one configuration, each content item stored in content storage 118 can be assigned a system-wide unique identifier.

Content storage 118 can decrease the amount of storage space required by identifying duplicate content items or duplicate segments of content items. In one embodiment, for example, a content item may be shared among different users by including identifiers of the users within ownership metadata of the content item (e.g., an ownership list), while storing only a single copy of the content item and using pointers or other mechanisms to link duplicates with the single copy. Similarly, content storage 118 stores content items using a version control mechanism that tracks changes to content items, different versions of content items (such as a diverging version tree), and a change history. The change history includes a set of changes that, when applied to the original content item version, produces the changed content item version.

Content management system 100 automatically synchronizes content items from one or more client devices, using synchronization module 412, which is one means for performing this function. The synchronization is platform-agnostic. That is, the content items are synchronized across multiple client devices 120 of varying type, capabilities, operating systems, etc. For example, client application 120 synchronizes, via synchronization module 412 at content management system 100, content in client device 120's file system with the content items in an associated user account on system 100. Client application 200 synchronizes any changes to content items in a designated folder and its sub-folders with the synchronization module 412. Such changes include new, deleted, modified, copied, or moved files or folders. Synchronization module 412 also provides any changes to content associated with client device 120 to client application 200. This synchronizes the local content at client device 120 with the content items at content management system 100.

Conflict management module 414 determines whether there are any discrepancies between versions of a content item located at different client devices 120. For example, when a content item is modified at one client device and a second client device, differing versions of the content item may exist at each client device. Synchronization module 412 determines such versioning conflicts, for example by identifying the modification time of the content item modifications. Conflict management module 414 resolves the conflict between versions by any suitable means, such as by merging the versions, or by notifying the client device of the later-submitted version. Conflict management module 414 may use the synchronization handler 106, as described below.

A user can also view or manipulate content via a web interface generated by user interface module 402. For example, the user can navigate in web browser 360 to a web address provided by content management system 100. Changes or updates to content in content storage 118 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 400 for interfacing with various client devices 120, and with other content and/or service providers via an Application Programming Interface (API), which is one means for performing this function. Certain software applications access content storage 118 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 118 through a web site.

Content management system 100 can also include authenticator module 406, which verifies user credentials, security tokens, API calls, specific client devices, etc., to determine whether access to requested content items is authorized, and is one means for performing this function. Authenticator module 406 can generate one-time use authentication tokens for a user account. Authenticator module 406 assigns an expiration period or date to each authentication token. In addition to sending the authentication tokens to requesting client devices, authenticator module 406 can store generated authentication tokens in authentication token database 420. Upon receiving a request to validate an authentication token, authenticator module 406 checks authentication token database 420 for a matching authentication token assigned to the user. Once the authenticator module 406 identifies a matching authentication token, authenticator module 406 determines if the matching authentication token is still valid. For example, authenticator module 406 verifies that the authentication token has not expired or was not marked as used or invalid. After validating an authentication token, authenticator module 406 may invalidate the matching authentication token, such as a single-use token. For example, authenticator module 406 can mark the matching authentication token as used or invalid, or delete the matching authentication token from authentication token database 420.

Content management system 100 includes a sharing module 410 for sharing content publicly or privately, which is one means for performing this function. Sharing content publicly can include making the content item accessible from any computing device in network communication with content management system 100. Sharing content privately can include linking a content item in content storage 118 with two or more user accounts so that each user account has access to the content item. The content can also be shared across varying types of user accounts.

In some embodiments, content management system 100 includes a content management module 408 for maintaining a content directory that identifies the location of each content item in content storage 118, and allows client applications to request access to content items in the storage 118, and which is one means for performing this function. A content entry in the content directory can also include a content pointer that identifies the location of the content item in content storage 118. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes a user account identifier that identifies the user account that has access to the content item. In some embodiments, multiple user account identifiers can be associated with a single content entry indicating that the content item has shared access by the multiple user accounts.

To share a content item privately, sharing module 410 adds a user account identifier to the content entry associated with the content item, thus granting the added user account access to the content item. Sharing module 410 can also be configured to remove user account identifiers from a content entry to restrict a user account's access to the content item.

To share content publicly, sharing module 410 generates a custom network address, such as a URL, which allows any web browser to access the content in content management system 100 without any authentication. The sharing module 410 includes content identification data in the generated URL, which can later be used by content management system 100 to properly identify and return the requested content item. For example, sharing module 410 can be configured to include the user account identifier and the content path in the generated URL. The content identification data included in the URL can be transmitted to content management system 100 by a client device to access the content item. In addition to generating the URL, sharing module 410 can also be configured to record that a URL to the content item has been created. In some embodiments, the content entry associated with a content item can include a URL flag indicating whether a URL to the content item has been created.

Content management system 100 may be implemented using a single computer, or a network of computers, including cloud-based computer implementations. For the purposes of this disclosure, a computer is device having one or more processors, memory, storage devices, and networking resources. The computers are preferably server class computers including one or more high-performance CPUs and 1G or more of main memory, as well as 500 Gb to 2 Tb of computer readable, persistent storage, and running an operating system such as LINUX or variants thereof. The operations of content management system 100 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, failover servers, network management tools and so forth are not shown so as not to obscure the features of the system. Finally, the functions and operations of content management system 100 are sufficiently complex as to require implementation on a computer system, and cannot be performed in the human mind simply by mental steps.

Figure 5A:
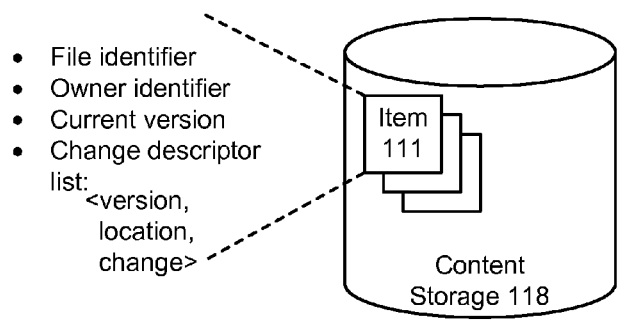
FIGS. 5A-5C illustrate in more detail the various components of the synchronization handler and the synchronization logic of FIG. 1B, according to one embodiment.
Figure 5B:
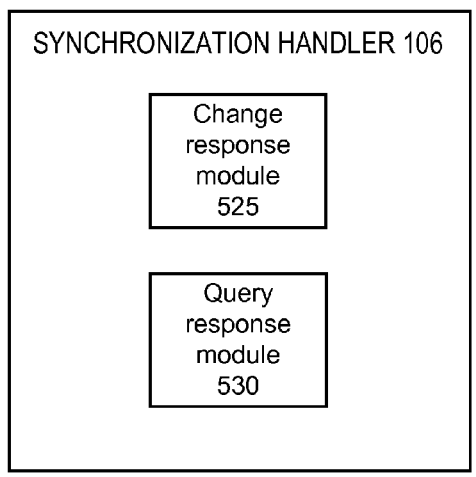
Figure 5C:
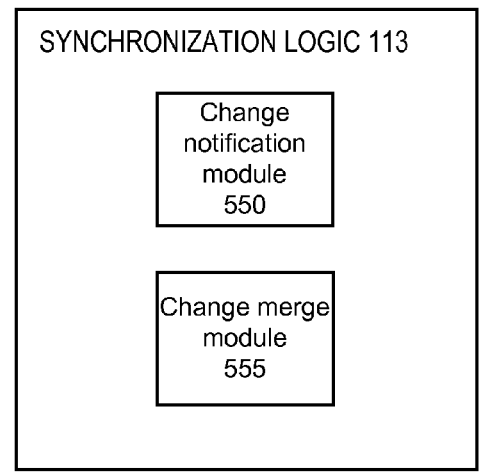

FIGS. 5A-5C illustrate in more detail the various components of the synchronization handler 106 of the content management system 100 and the synchronization logic 113 of the client devices 120.

The content storage 118 contains content items 111, each content item 111 representing a state of the content item to be synchronized across the different client devices 120 by the content management system 100. Each content item has a set of associated data and metadata, including (for example) an identifier uniquely identifying the content item (e.g., the string "item383aqi32", or a unique integer), an owner identifier uniquely identifying a registered user of the content management system 100 to whom the content item belongs (e.g., the string "user82ax2p", a username or email address, or a unique integer), a current version (e.g., the integer 17), and a list of change descriptors. The current version is used during synchronization to determine whether a given content item has been inconsistently updated.

The change descriptors associated with content item 111 collectively describe the state of content item 111 as a series of changes with respect to some base state of the content item. Each change descriptor includes a version indication representing the version of the content item at the time that the content item was changed by that change descriptor, a representation of the semantic location of the change, and a representation of the change itself. The representation of the semantic location of the change describes the location in a semantic, rather than physical, manner that is appropriate for use by application 112 and corresponds to data provided as part of the synchronization API, as described below. For example, in one embodiment described below, the location of the change is represented by the pair <record, field>, where record represents a particular high-level unit of the data within content item 111, and field represents a sub-unit of a record.

The <record, field> representation of a location is particularly suitable for content items where the data can be described according to a well-defined semantic structure. For example, for the above-described content items representing the stages of the game that a user has unlocked, the records could represent the individual lines within a file embodying the content item (i.e., the worlds within the game), and the fields could represent the individual elements within each line (i.e., the stages within each world). Although in this embodiment the synchronization API requires applications 112 to represent the locations of changes to data in terms of records and fields, the correspondence between given records/fields and physical byte locations is left to the individual applications to determine. Thus, a record need not represent a series of characters or bytes making up a textual line, nor need it even represent contiguous data. Rather, individual application 112 may map a particular record to any portion or set of non-contiguous portions of the data in the file(s) embodying the content item, provided that all instances of the application perform the mapping in the same way.

The change itself is represented within the change descriptor as the value to which the data corresponding to the given location is set, such as the integer or string "1," representing that the level corresponding to a particular record and field has been unlocked. In one embodiment, the representation of the change may also include the prior value of the data at the given location, before the change was made, such as the integer or string "0", representing that the level had not previously been unlocked.

It is appreciated that the exact types of data or metadata associated with a content item may vary in different embodiments, and that the above description of the associated data represents one particular embodiment. For example, the location need not be represented as a <record, field> pair, but may be represented in any semantically meaningful manner that allows the applications 112 to determine whether changes to different locations can be reconciled.

FIGS. 5B and 5C illustrate components of synchronization handler 106 of content management system 100 and synchronization logic 113 of applications 112 of client devices 110, which interact to effect synchronization across the client devices.

Specifically, client synchronization logic 113 comprises change notification module 550 that application 112 uses to notify synchronization handler 106 of changes that the application has made to local content item copy 111, and that should accordingly be made to content item copy 111 in content storage 118. The notifications provided by change notification module 550 conform to the synchronization API provided by synchronization handler 106. In one embodiment, the synchronization API includes functions to add, delete, and modify data within the content items. For example, such functions might be defined as follows:

syncInsert(itemID, version, record, field, value)
    syncDelete(itemID, version, record)
    syncModify(itemID, version, record, field, value)

where record, field, and value together constitute the change descriptor. Specifically, itemID denotes a unique identifier of the affected content item, version denotes an indication of the version of the local content item copy 111, record denotes a position at which to insert a record relative to other records (e.g., 1, denoting that a new record should be added after the first record) or an identifier of a record to delete or modify, field denotes the field within the record that is being inserted or modified, and value denotes the data to insert or modify at the location represented by the given record and field. For example, the function invocation syncModify(f, v, 1, 2, "1") might signify the change of the first record of version v of a content item f, with the second field being set to the value "1."

It is appreciated that in other embodiments the synchronization API may be different from the example described above. For example, the API could include a different number of functions, or of parameters within the various functions. For instance, rather than having a single field and value parameter, the syncModify function could support a variable number of <field, value> pairs. Additionally, the synchronization API functions could specify different data types for the given value parameters, such as integer, string, floating point, and the like. The functions could also permit the client applications 112 to specify rules—e.g., as arbitrary blocks of code—defining how the change will be performed, such as adding values instead of merely overwriting values.

Change notification module 550 implements calls to the functions of the synchronization API by sending a message over the network to synchronization handler 106 of content management system 100. Specifically, the message contains data corresponding to the function itself (e.g., "Modify"), and the parameters of the synchronization API functions (e.g., itemID, version, record, field, and value). For example, the message might have the values <"item383aqi32", 17, "Modify", 1, 2, "1">, representing a request to modify the 17th version of the content item "item383aqi32" by writing the value "1" into record 1, field 2.

Representing updates to a content item in terms of change descriptors allows significantly faster synchronization than would be possible when sending the entire contents of the changed content item. For example, if the size of a particular content item were 1 MB, and a change set could be represented in 1K, then only 0.1% of the amount of data need be sent to synchronize the content item with respect to the total amount of data in the content item, permitting frequent, essentially real-time synchronization.

Change response module 525 of synchronization handler 106 receives the message sent by change notification module 550, implementing the same change described by the message within the content storage 118 if possible, and notifying application 112 if not. Specifically, change response module 525 finds the content item 111 given by the message item identifier within content storage 118. The content item version given by the message is then compared to the content item version of the content item in the content storage 118. If the versions match, then there have been no intervening changes made by other applications 112 to the content item in the content storage 118. In this case, change response module 525 incorporates the change specified by the message.

In one embodiment, since content management system 100 need not itself understand the data semantics of content item 111, change response module 525 does not itself modify the contents of content item 111, but rather represents the contents of content item 111 as a series of change descriptors. Accordingly, to incorporate the given change to content item 111, change response module 525 need simply append the given change descriptor to the list of change descriptors. The content of content item 111 can then be reconstructed by applications 112 using the cumulative set of change descriptors.

In other embodiments, change response module 525 has sufficient knowledge of the semantics of some or all of the possible modifications or other operations on content items to enable it to update the data of its local copy of content item 111 to reflect the modification(s), without relying on applications 112 to effect the modification(s). This reduces or eliminates the burden on applications 112 to update the data, and (correspondingly) on the authors of applications 112 to write code embodying the semantics of operations on content items. Synchronization handler 106 can then handle requests from clients 120 for the latest version of a content item 111, providing the data content item 111, rather than a representation of the collection of changes to content item 111. To better enable change response module 525 to understand application operation semantics, the synchronization API may be extended to provide additional functions corresponding to different possible types of semantic operations. In one embodiment, the change response module 525 queues the different operations on content items 111 as they are received from clients 120, executing the operations and updating the local copies of content items 111 accordingly when feasible. If a client request for content item data—as opposed to a request for the collection of content item modifications—is received before all the operations on the content items have been performed, the change response module 525 performs all the remaining queued operations on the content items before synchronization handler 106 sends the content item data to the client. In one embodiment, synchronization handler 106 can determine the data of an older version of a content item 111—e.g., in response to a client 120 requesting an older version—by "undoing" in reverse chronological order the change descriptors corresponding to prior operations on content item 111. To facilitate the undoing, the change response module 525 may store additional data associated with the change descriptors, such as (for a modification operation) the previous values of the portions of data that were modified.

The change response module 525 additionally updates the version of content item 111 as stored in content storage 118 to reflect that the content has changed. For example, in one embodiment the version is represented by a version indication integer, which is increased by one for every successive version.

In one embodiment, as an alternative or supplement to itself determining the data of a content item 111, the synchronization handler 106 can request the content of the content item 111 from applications 112 and store that content within content storage 118. Having the actual content of some version of content item 111, rather than merely the set of change descriptors producing it, allows the corresponding change descriptors to be discarded from content storage 118, and also reduces the amount of processing required by applications 112 to reconstruct the content item contents. To reduce the amount of data to be transferred, such requests can be made infrequently, such as after some number N of change descriptors have been accumulated.

In one embodiment, if the content item version specified by a received message to perform an operation on content item 111 does not match the version of the content item in content storage 118—i.e., the version in the message corresponds to an older version than the version in content storage 118—then change response module 525 instead informs application instance 112 that the change has been rejected. In one embodiment, the message that informs application instance 112 that the change has been rejected includes: an indication that the change has been rejected, the version of the content item 111 currently within the content storage 118, and the change descriptor(s) corresponding to the version(s) after the version specified by the application instance in the change request message. For example, if the change request message from the application instance 112 specified the version 17, and content storage 118 contained the version 18 for the given content item, then the change response module 525 would send the change descriptor that caused version 17 of the content item to become version 18. Similarly, if the request message specified version 16, and the content storage 118 contained version 18, then the change response module 325 would send the change descriptors corresponding to the 17th and 18th versions. It is appreciated that the messages exchanged between application instance 112 and synchronization handler 106 may differ from those described above. For example, in some embodiments synchronization handler 106 merely provides a messages specifying that the change has been rejected and the version of content item 111 currently within content storage 118, and it is left to application instance 112 to request the change descriptors corresponding to the changes that took place between the current version and the requested version.

The synchronization logic 113 of the applications 112 additionally comprises change merge module 555, which is used to reconcile the conflicting changes in the case of a change that was rejected by change response module 525 of the synchronization handler 106. Specifically, if synchronization logic 113 receives a message rejecting the change sent to content management system 100 by change notification module 550, it delegates to change merge module 555 to reconcile the changes. Change merge module 555, being part of application instance 112 itself, has knowledge of the semantics of the data within content item 111, and thus has the necessary information to properly reconcile its own change with the changes already made by other application instances 112. Change merge module 555 can enforce the semantics of the content item by defining a set of rules about how the different semantic locations may be modified relative to other locations in the content item and applying those rules to determine whether, or to what extent, the changes can be merged. In embodiments in which content management system 100 has knowledge of the semantics of operations on content items 111, change merge module 555 may be partially or entirely implemented using calls to a client library provided by content management system 100. In such embodiments, applications 112 use calls to functions of the client library to implement the operations.

For instance, referring again to the example of the content item 111 representing the state of the game, the rules defined by change merge module 555 of the associated applications 112 might specify that changes to different fields are not inconsistent and thus may be independently implemented, whether within the same record or within different records. This rule reflects the fact that the "unlock level" action of the game is an associative operation, in that the resulting state of the game is the same whether the second level is unlocked before the third level, or the third level is unlocked before the second level. If, however, the game only allowed a certain number of levels to be unlocked per world, then the rules could be defined to ensure that the unlocking of the second and the third levels did not result in more than the maximum number of unlocked levels for the corresponding world. If this rule were violated—e.g., if both "unlock level" changes resulted in one more than the maximum permissible number of unlocked levels—then the rules could mandate that (for example) only one of the two "unlock level" changes be made. Accordingly, change merge module 525 might undo the effect of the "unlock level" change already made by its application instance 112 to the local content item copy, instead implementing the "unlock level" change already successfully reflected in content storage 118 of content management system 100. It is appreciated that the rules defined by the application's change merge module 555 could encompass any type of action appropriate to the semantics of the content item data in question.

Note also that a rule could permit separate changes to the same semantic location based on the known meaning of the data stored at that location. For example, if the particular semantic location (e.g., record and field) in question represented an aggregate count, and one change increased the value at the semantic location by 2, and the other increased its value by 3, the synchronization logic 113 could incorporate both changes by increasing the value of the semantic location by 2+3=5.

Synchronization handler 106 may additionally comprise query response module 530, which is used by applications 112 to obtain the latest version of content item 111. Query response module 530 receives a query from application instance 112 for content item copy 111C from content storage 118, as represented by a particular content item identifier, along with an indication of the version of the corresponding content item copy currently stored by the application instance. In one embodiment, query response module 530 in turn provides application instance 112 with a response describing the changes not already reflected in the copy of content item 111 stored by the application, if any. The provision of such changes is similar to that performed by change response module 525 when it rejects the attempted incorporation of a change—namely, query response module 530 provides an indication of the version of the content item currently stored in content storage 118, along with the change descriptors corresponding to any versions more recent than the version indicated by the application. The querying application instance 112 can then update its content item copy 111 to the latest version by using its change merge module 555 to incorporate the provided change descriptors and by updating its corresponding version to that provided by query response module 530.

In some embodiments, application instance 112 polls content management system 100—e.g., at periodic intervals—for any new changes. For example, application instance 112 can provide the request and an indicator of the version currently accessible to application instance 112. Query response module 530 could in turn reply with, for example, the data corresponding to the copy of content item 111 currently stored in content storage 118, or a list of the change descriptors corresponding to changes later than (i.e., received by the content management system after) the given version, or an indicator that there may have been a change (in response to which application instance 112 could affirmatively request the data of the latest version or the list of the relevant change descriptors). In other embodiments, application instance 112 sends a message to content management system 100 requesting notification of changes to content item 111, e.g., any changes later than a given version of a content item 111 specified in the request. In response, query response module 530 registers the requesting application instance in association with the given content item 111 and version, and notifies the requesting application of any changes to the given content item.

As noted above, in some embodiments, query response module 530 alternatively and/or additionally provides the complete data for content item 111, rather than the change descriptors corresponding to the current state of content item 111.

Figure 6:
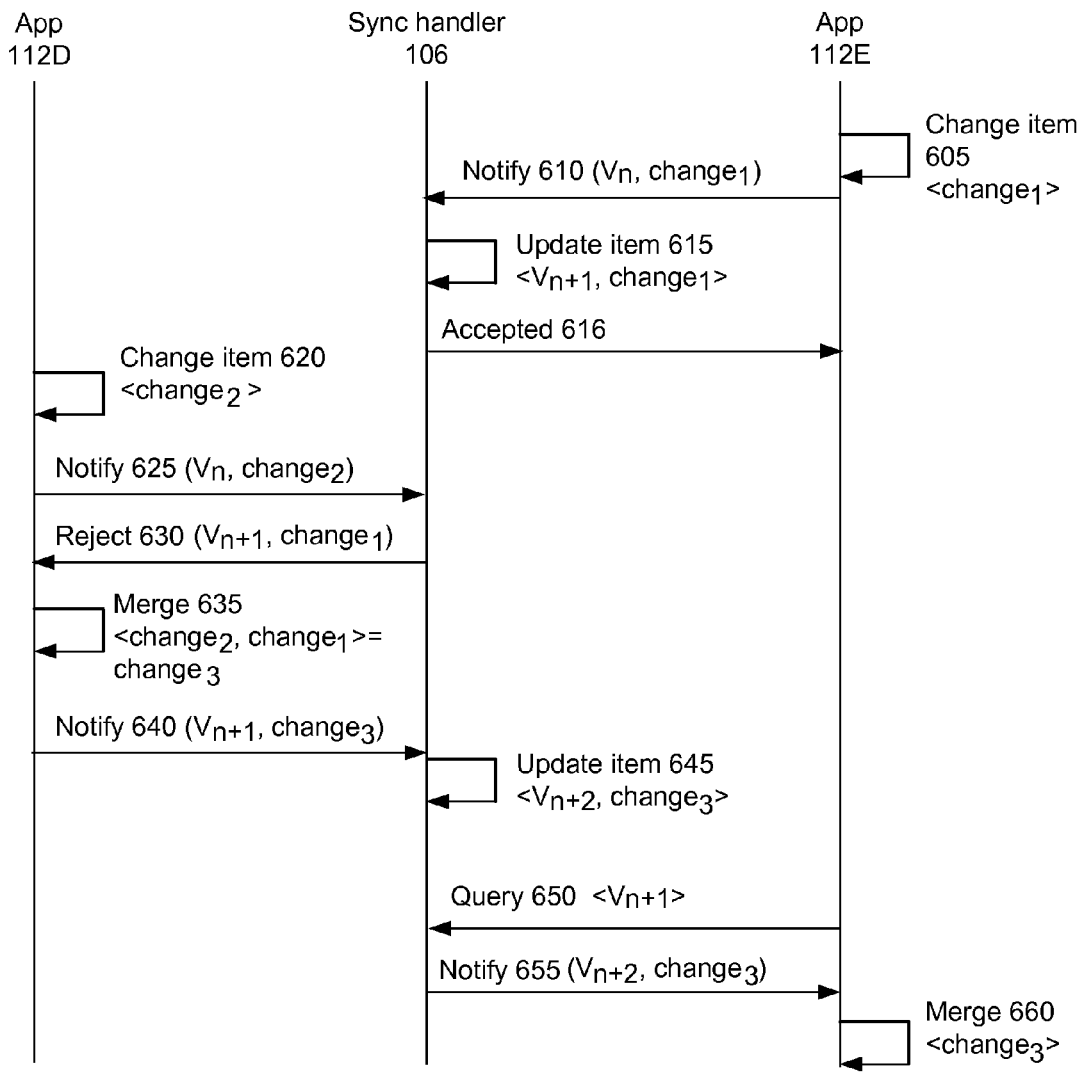
FIG. 6 illustrates the interactions between client applications and a content management system when synchronizing changes between copies of a content item, according to one embodiment.

FIG. 6 illustrates the interactions between client applications 112 and content management system 100 when synchronizing changes between local copies of content item 111, according to one embodiment.

Assume that before the start of the interactions illustrated in FIG. 6, content item copies 111D, 111E of application instances 112D, 112E are synchronized and up-to-date—that is, that both copies 111D, 111E have the same data as copy 111C stored in content storage 118 of content management system 100, which currently has some version indication denoted n. Application instance 112E then changes 605 its associated copy 111E according to an operation denoted change₁. Referring back to the example illustrated in FIGS. 2A-2C, application instance 112E might modify the data of the file content item in FIG. 2A, producing the contents of FIG. 2B. This change might be denoted by the change descriptor change₁=<1, 2, "1">, representing a change of record 1, field 2, to the value "1" to reflect that the user unlocked the second level of the first world.

In order to ensure that other application instances 112 also have access to the modified data, application instance 112E notifies 610 content management system 100 using the synchronization API of the synchronization handler 106. That is, the change notification module 550 calls the function of the synchronization API that indicates a change, causing a message describing the change to be sent to the synchronization handler 106. The message data include the identifier of content item 111, the version indication of content item 111, and a descriptor of the change to the content item, which specifies a location of the change within the content item (e.g., a record number and field number) and the value assigned to that location. Referring to the above example, application instance 112E might call the function syncModify ("item383aqi32", 17, 1, 2, "1"), where "item383aqi32" is the content item identifier, 17 was the existing version indication at the time of the change, 1 indicates the changed record, 2 indicates the changed field, and "1" indicates the new value assigned to record 2, field 1.

Synchronization handler 106 receives the content item change message from application 112D and updates 615 the state of the content item corresponding to the given item identifier (e.g., "item383aqi32"). Specifically, the synchronization handler compares the version indication given by the application instance 112E (e.g., 17) to the version indications currently listed within content storage 118 for the item identifier given by application instance 112E. Since (in this example) the version indications match, synchronization handler 106 determines that there have been no intervening changes to content item copy 111C by other application instances 112 and accordingly adds the change descriptor (e.g., <1, 2, "1">) to the list of changes to copy 111C. Synchronization handler 106 additionally increments, or otherwise changes, the version indication (e.g., to 18) and associates it with the new change descriptor, signifying that that particular change resulted in the current version. Alternatively, in embodiments in which synchronization handler 106 has knowledge of the semantics of the operation resulting in the change to content item 111, synchronization handler 106 computes the resulting data corresponding to the current state of content item 111, rather than simply storing the change descriptor of the operation that produced the current state.

In one embodiment, synchronization handler 106 additionally notifies 616 application instance 112E of acceptance of the update to content item 111. The notification may also include the resulting data corresponding to the current state of content item 111. In some embodiments, in order to address a loss of the notification of acceptance before its receipt by application instance 112E (e.g., due to network error), change descriptors include a value that identifies the corresponding change with high probability (e.g., a random value). Thus, for example, assume that application 112E never receives notification 616 of acceptance of change 605, and later queries content management system 100 for the current state of the content item, receiving a list of the relevant change descriptors. Application instance 112E can then determine that change 605 was, in fact, almost certainly incorporated into the copy of the content item stored on content management system 100 by identifying the value corresponding to change 605 within one of the change descriptors.

At some point, independent of the actions of application instance 112E, application instance 112D separately changes 620 its copy 111D, which does not reflect the change of step 605. For example, client device 120D executing application instance 112D may have lacked network connectivity at the time, and thus would not have learned of the update of step 615. After regaining network connectivity, application instance 112A then notifies 625 content management system 100 of the change by calling the API function in the same manner as that of application instance 112E, such as by calling syncModify("item383aqi32", 17, 1, 3, "1"), assuming that the change is described by the change descriptor <1, 3, "1">, as previously illustrated in FIG. 2C.

Synchronization handler 106 of content management system 100 receives the call of the application instance 112D and compares the version indication (e.g., 17) for the content item with the version indication currently associated with the content item in content storage 118 (e.g., 18). Since they differ, with the version stored in content storage 118 being more recent and thus signaling that there have been intervening synchronized changes by other application instances 112, the synchronization handler 106 notifies 630 application instance 112D that its attempt to synchronize the change has been rejected. As part of the rejection, the synchronization handler 106 provides the application instance 112D with the content item version indication currently stored in content storage 118 (e.g., 18), along with the corresponding change descriptor (e.g., <1, 2, "1">).

Using the information provided by the synchronization handler 106 as part of the rejection 630, application instance 112D merges 635 the change made by application instance 112E at step 605 with the changes made by application instance 112A at step 620. Specifically, application instance 112A has already incorporated the change of step 620 into its copy 111D, and it determines how to additionally incorporate the change of application instance 112E at step 605, as represented by the change descriptor provided by synchronization handler 106 as part of the rejection of step 630. Using the change location information of the change descriptor (e.g., record 1, column 2), application instance 112A determines whether the two changes conflict, i.e., refer to the same semantic location within the content item, or whether there is any other rule that would preclude the change from step 605 from being merged with the change of step 620. Continuing the above example, the application instance 112D determines that the changes do not conflict, since the two changes modify different fields within the same record, and there is no rule that is violated by independent fields being set to the value "1." Accordingly, application instance 112D merges the changes by setting the second field of the first record of its content item copy 111D to the value "1," thereby implementing the same change performed by application instance 112B at step 605.

It is appreciated that the merge 635 could be accomplished in other manners, as well. For example, application instance 112A could "undo" its own changes 620, apply the change descriptors obtained as part of (or in response to) rejection 630, and then attempt to re-apply its changes 620.

Further, in order to allow application instance 112D (and any other application instances) to be synchronized, application instance 112D notifies 640 the synchronization handler 106 of the merge. Specifically, application instance 112D calls the API function in the same manner as before, but this time including the version indication corresponding to content item copy 111C that is already stored in content storage 118. This reflects the fact that the separate changes made by application instances 112D, 112E were not inconsistent, and therefore could be applied separately in either order without altering the resulting state of content item 111. Referring again to the above example, for instance, application instance 112A would call syncModify("item383aqi32", 18, 1, 3, "1") to incorporate its own update within content item 118.

Synchronization handler 106 then receives the data passed in the API function, and since this time the versions of content item 111 match (e.g., both are 18), synchronization handler 106 computes the next version indication (e.g., 19) and adds it to content storage 118 in association with content item 111 and with the provided change descriptor (e.g., <1, 3, "1">) that produced the current content item state. Then, when the content item 111E of application instance 112E is synchronized with content storage 118—e.g., by application 112E querying 650 synchronization handler 106 for any new versions of content item 111 and synchronization handler 106 responding by notifying 655 application instance 112E of the change, or synchronization handler 650 notifying application instance 112B in response to a previous request of application instance 112B to be notified of updates—application 112E can merge 660 the change from step 620 into its own content item copy 111D.

As a result of the updates of steps 615, 645 and the corresponding merges of steps 435, 460, copies 111D, 112E have been synchronized with respect to copy 111C within content storage 118 and (by extension) with each other. Accordingly, the user of client devices 110D, 110E will be able to use application 112 on either of the devices and the state of the application will be the same on both.

Note that in embodiments that delegate the understanding of the semantics of content item 111 to applications 112 on client devices 120, content management system 100 is freed from the necessity of calculating changes to the content items and performing merge operations. In this way, content management system 100 can facilitate synchronization of content items across an unlimited number of different data formats by acting as an intermediary that provides applications 112 with descriptions of the various changes that were made, relying on the applications themselves to interpret and incorporate these changes. Thus, it is appreciated that although for simplicity the above examples have focused on different instances of a single application, content management system 100 supports any number of different applications and their corresponding different file data formats. It is likewise appreciated that although for purposes of clarity the above examples have described only two distinct client devices 120, application instances 112, and content items 111, content management system 100 supports any number of them. Thus, when implemented, content management system 100 may be in communication with thousands or millions of client devices 120, and each client device may store one or multiple content items on content management system 100. Content management system 100 and its components may be implemented using any appropriate hardware for performing data serving and storage. Additionally, many components required for operation of a content management system and service, known to those of skill in the art but not germane to this description—for example, network cards, CPUs, memory, and the like—have been omitted for clarity.

Additionally, the data that is synchronized across applications 112 and client devices 120 need not be a discrete file recognizable by the file system of a particular operating system, but rather is any portion of content item data having semantic meaning to applications 112. For example, the synchronized data could be a particular portion of a relational database. Thus, the more general terms "object" or "data" could be substituted for the term "file" in the above description while still achieving the same function.

Figure 7:
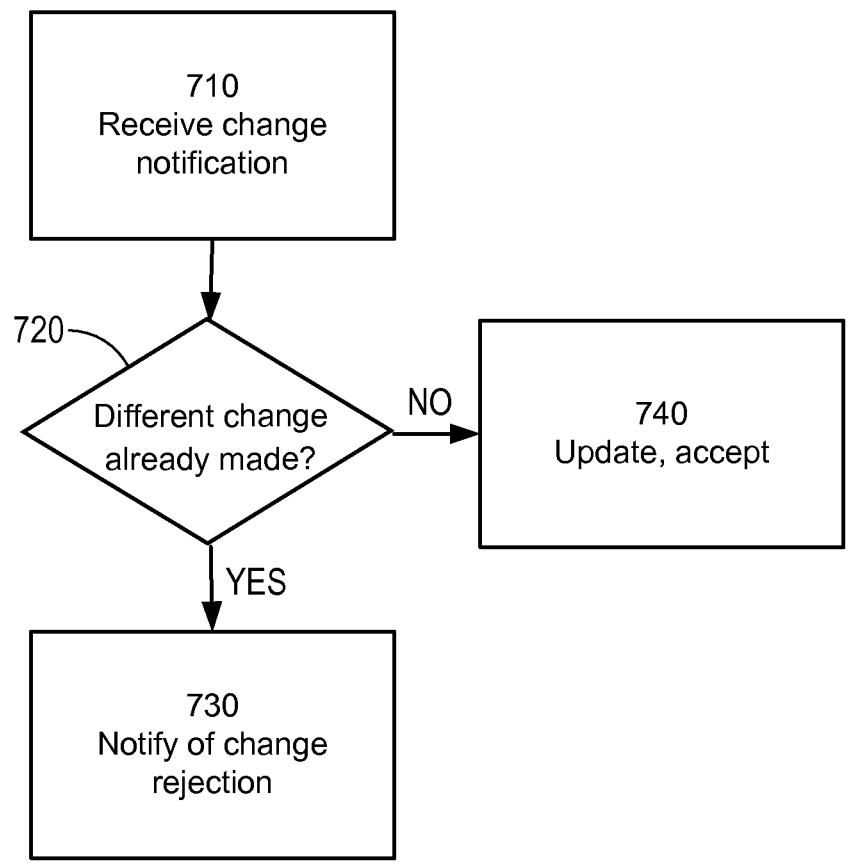
FIG. 7 shows actions performed by the content management system in response to receiving a content item change notification, according to one embodiment.

FIG. 7 shows actions performed by content management system 100 in response to receiving a content item change notification, according to one embodiment.

Content management system 100 receives 710 notification of a change to content item 111, as in step 625 of FIG. 6. The notification comprises an indication of a semantic location of the change within content item 111, such as a <record, field> indication, as well as an indicator of a version of the content item. Application 112 of client 120 may have sent the notification using the sync API, such as by calling syncModify ("item383aqi32", 17, 1, 3, "1"), as described above.

Content management system 100 determines whether a different change has already been made with 720 respect to the received indicator of the version of content item 111. For example, if content item 111 as stored in content repository 111 has a different (e.g., greater) version than the received version indicator, then it is likely that another client device 120 has made a separate, different change to content item 111 not already reflected in the copy of content item 111 stored on the client device that sent the change notification.

If a different change has already been made 720, content management system 100 notifies 730 the client device 120 that sent the change notification, as described above with respect to the rejection 630 of FIG. 6. The notification of change rejection includes an indication of a second semantic location in the content item corresponding to the separate, different change, the second semantic location having been provided to content management system 100 by the client device that made the separate, different change. The notification of change rejection also includes (for example) an indication of the version of content item 111 currently stored in content storage 118, as well as the associated change descriptor(s) and an indication of a semantic location corresponding to the separate change. The client device that sent the notification of step 710 can use the information provided in the notification of change rejection to merge its own changes with the separate, different, change, for example, as described above with respect to step 635 of FIG. 6.

If a different change has not already been made 720, content management system 100 updates 740 content item 111 and (optionally) notifies the client device 120 that sent the change notification that the change was accepted, as described above with respect to steps 615 and 616 of FIG. 6.

Figure 8:
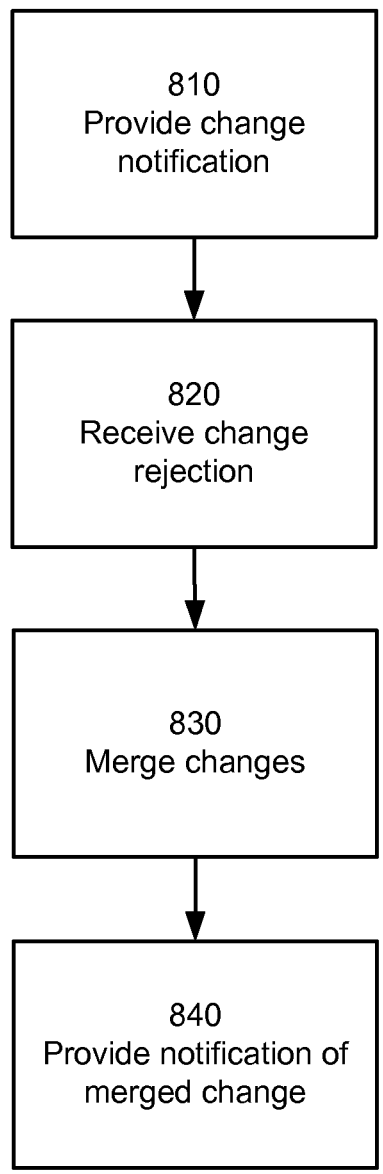
FIG. 8 shows actions performed by a client device as part of making a change to a content item, according to one embodiment.

FIG. 8 shows actions performed by a client device as part of making a change to a content item, according to one embodiment.

Client device 120 changes a copy of content item 111 within its local content 304, and accordingly notifies 810 content management server 100 of the change, as described above with respect to step 625 of FIG. 6.

If (for example) another client device 120 has already made a separate change to content item 111 and content management system 100 has noted the separate change, client device 120 will receive 820 a notification of rejection of the change, as described above with respect to step 630 of FIG. 6. The notification of rejection includes (for example) an indication of a semantic location corresponding to the separate change to content item 111, as well as the associate change descriptor(s) and an indication of the version of content item 111 currently stored in content storage 118.

Client device 120 uses the indication of the semantic location corresponding to the separate change to merge 830 its own change and the separate change within the copy of content item 111 within its local content 304, as described above with respect to step 635 of FIG. 6. Client device 120 also notifies 840 content management system 100 of the merged change (which constitutes a third change, which may be different from the original change reported in step 810), as described above with respect to step 640 of FIG. 6. Content management system 100 can accordingly update its copy of content item 111 to reflect the combination of the separate change performed by the other client device and the change performed by client device 120.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

It should be noted that the process steps and instructions can be embodied in software, firmware or hardware, and when embodied in software, can be downloaded to reside on and be operated from different platforms used by a variety of operating systems.

The operations herein may also be performed by an apparatus. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method performed by a content management system, the method comprising:

receiving, by the content management system from a first client device, a notification of a change to a content item stored on the first client device, the content item having a data format with data semantics unknown to the content management system, the notification of the change comprising an indication of a first semantic location of the change within the content item and an indication of a first version of the content item at a time of the change;

determining, based on the indication of the first version of the content item, whether a second client device has already made a second change to the content item with respect to the first version of the content item;

responsive to determining that the second client device has already made the second change, providing a notification of change rejection to the first client device, the notification of change rejection comprising an indication of a second semantic location of the second change within the content item, the indication of the second semantic location having been provided by the second client device;

receiving a request from the second client device to receive changes to the content item;

registering the second client device to receive changes to the content item;

receiving from the first client device a notification of a third change resulting from the first client device combining the change and the second change, the notification of the third change comprising an indication of a third semantic location of the third change within the content item; and responsive to receiving the notification of the third change, providing a notification of the third change to the second client device.

2. The computer-implemented method of claim 1, further comprising:

storing the indication of the third semantic location within content storage in association with an identifier of the content item.

3. The computer-implemented method of claim 2, wherein the second change made by the second client device resulted in a second version of the content item, the second version being later than the first version, the method further comprising:

receiving a query from a third client device for changes to the content item since the second version, the query being distinct from a notification of a change to a content item;

responsive to receiving the query, providing to the third client device the indication of the third semantic location of the third change for incorporation by the third client device of the third change within a copy of the content item stored on the third client device.

4. The computer-implemented method of claim 1, wherein the indications of the first and second semantic location are specified in terms of an indicator of a record within the content item and an indicator of a field within the record.

5. The computer-implemented method of claim 4, wherein neither the indicator of the record nor the indicator of the field contains a byte-based location.

6. The computer-implemented method of claim 1, wherein determining whether a second client device has stored a second change to the content item with respect to the first version of the content item comprises comparing a version indicator provided by the first client device along with the notification of the change, and a version indicator stored in association with the content item.

7. The computer-implemented method of claim 1, wherein the notification of the change to the content item is specified using an application programming interface (API) of the content management system, the API comprising an insert function to insert a record within a content item, a delete function to delete a record within a content item, and a modify operation to modify a field of a record within a content item.

8. The computer-implemented method of claim 1, wherein the change to the content item is a single logical change corresponding to a plurality of distinct physical portions of the content item.

9. A non-transitory computer-readable storage medium having executable computer program instructions embodied therein, the instructions comprising:
  instructions for receiving, from a first client device, a notification of a change to a content item stored on the first client device, the notification of the change comprising an indication of a first semantic location of the change within the content item and an indication of a first version of the content item at a time of the change;
  instructions for determining, based on the indication of the first version of the content item, whether a second client device has made a second change to the content item with respect to the first version of the content item;
  instructions for providing a notification of change rejection to the first client device responsive to determining that the second client device has made the second change, the notification of change rejection comprising an indication of a second semantic location of the second change within the content item, the indication of the second semantic location having been provided by the second client device;
  instructions for receiving a request from the second client device to receive changes to the content item;
  instructions for registering the second client device to receive changes to the content item;
  instructions for receiving from the first client device a notification of a third change resulting from the first client device combining the change and the second change, the notification of the third change comprising an indication of a third semantic location of the third change within the content item; and
  instructions for, responsive to receiving the notification of the third change, providing a notification of the third change to the second client device.

10. The non-transitory computer-readable storage medium of claim 9, the instructions further comprising:
  instructions for storing the indication of the third semantic location within a content item repository in association with an identifier of the content item.

11. The non-transitory computer-readable storage medium of claim 10, wherein the second change made by the second client device resulted in a second version of the content item, the second version being later than the first version, the instructions further comprising:
  instructions for receiving a query from a third client device for changes to the content item since the second version;
  instructions for providing to the third client device the indication of the third semantic location of the third change for incorporation by the third client device of the third change within a copy of the content item stored on the third client device, responsive to receiving the query.

12. The non-transitory computer-readable storage medium of claim 9, wherein the indications of the first and second semantic location are specified in terms of an indicator of a record within the content item and an indicator of a field within the record.

13. The non-transitory computer-readable storage medium of claim 12, wherein neither the indicator of the record nor the indicator of the field contains a byte-based location.

14. The non-transitory computer-readable storage medium of claim 9, wherein determining whether a second client device has stored a second change to the content item with respect to the first version of the content item comprises comparing a version indicator provided by the first client device along with the notification of the change, and a version indicator stored in association with the content item.

15. A non-transitory computer-readable storage medium having executable computer program instructions embodied therein, the instructions comprising:
  instructions for providing, to a remote server, a notification of a change to a content item stored on a client device, the notification of the change comprising an indication of a first semantic location of the change within the content item and an indication of a first version of the content item at a time of the change;
  instructions for receiving, from the remote server, a notification of change rejection comprising an indication of a second semantic location of a second change within the content item, the indication of the second semantic location having been provided by a second client device;
  instructions for, responsive to receipt of the notification of change rejection, merging the change and the second change within the content item stored on the client device, the merging resulting in a third change to the content item;
  instructions for providing to the remote server a notification of the third change to the content item;
  instructions for sending a request to the remote server to register to receive changes to the content item; and
  instructions for receiving, responsive to sending the request, a notification of a change made to the content item by a different client device.

16. A computer-implemented method comprising:
  receiving, from an application executing on a first client device, a notification of a change to a content item stored on the first client device, the notification of the change including:
    a numerical indication of a first record of the content item and a numerical indication of a first field within the first record in which the change was located, and
    an indication of a previous version of the content item identified with a previous version identifier;
  determining that the content item has previously been stored as a second change with respect to the previous version, the second change specified as being located within a second record of the content item and a second field within the second record and resulting in a second version later than the previous version;
  providing, to the application executing on the first client device:
    an indication of the second record and the second field, and
    an identifier of the second version;
  receiving a request from the second client device to receive changes to the content item;
  registering the second client device to receive changes to the content item;
  receiving, from the application executing on the first client device, an updated notification of the change to the content item stored on the first client device, the updated notification including:
    an indication of the first record of the content item, an indication of a merged change resulting from the application executing on the first client device merging the change with the second change within the content item stored on the first client device;

responsive to receiving the notification of the merged change, providing a notification of the merged change to the second client device; and storing the content item as the indication of the merged change in association with an identifier of a resulting third version later than the second version.

17. The computer-implemented method of claim 16, further comprising:

receiving a query from a third client device for changes to the content item since the second version;

responsive to receiving the query, providing to the third client device the indication of the first record and the indication of the merged change for incorporation by the third client device of the merged change within a copy of the content item stored on the third client device.

18. The computer-implemented method of claim 16, wherein neither the indication of the first record nor the indication of the first field contains a byte-based location.

19. The computer-implemented method of claim 16, wherein determining that the content item has previously been stored as a second change with respect to the previous version comprises comparing the previous version identifier with a version indicator stored in association with the content item.

\* \* \* \* \*